(12) United States Patent
Stausberg

(10) Patent No.: US 8,851,295 B2
(45) Date of Patent: Oct. 7, 2014

(54) FILTER DEVICE

(75) Inventor: Wolfgang Stausberg, Morsbach (DE)

(73) Assignee: IBS Filtran Kunststoff-/Metallerzeugnisse GmbH, Morsbach (DE)

( * ) Notice: Subject to any disclaimer, the term of this patent is extended or adjusted under 35 U.S.C. 154(b) by 1046 days.

(21) Appl. No.: 12/545,520

(22) Filed: Aug. 21, 2009

(65) Prior Publication Data

US 2010/0044301 A1 Feb. 25, 2010

(30) Foreign Application Priority Data

Aug. 21, 2008 (DE) .......................... 10 2008 038 602

(51) Int. Cl.
| | |
|---|---|
| B01D 35/00 | (2006.01) |
| B01D 35/28 | (2006.01) |
| B01D 29/11 | (2006.01) |
| B01D 27/14 | (2006.01) |
| B29C 65/50 | (2006.01) |
| B29C 65/48 | (2006.01) |
| B29C 65/08 | (2006.01) |
| B29L 31/14 | (2006.01) |

(52) U.S. Cl.
CPC ............ B01D 27/142 (2013.01); B01D 29/111 (2013.01); *B29C 65/48* (2013.01); *B29C 65/08* (2013.01); *B01D 2201/188* (2013.01); B29C 65/5071 (2013.01); B29C 65/5085 (2013.01); *B29L 2031/14* (2013.01)

USPC ............................ 210/448; 210/487; 210/446

(58) Field of Classification Search
None
See application file for complete search history.

(56) References Cited

U.S. PATENT DOCUMENTS

| | | | |
|---|---|---|---|
| 3,283,904 A | 11/1966 | Buckman et al. | |
| 5,762,792 A * | 6/1998 | Yamazaki | 210/323.2 |
| 5,984,109 A * | 11/1999 | Kanwar et al. | 210/440 |
| 6,540,914 B1 * | 4/2003 | Smith | 210/323.2 |

FOREIGN PATENT DOCUMENTS

| | | |
|---|---|---|
| FR | 1.407.307 A | 7/1964 |
| JP | 2000084312 A | 3/2000 |
| JP | 2005246253 A | 9/2005 |
| JP | 2005246254 A | 9/2005 |
| JP | 2007-327413 A | 12/2007 |

* cited by examiner

*Primary Examiner* — Dirk Bass
(74) *Attorney, Agent, or Firm* — Loza & Loza, LLP; Leo J. Jennings

(57) ABSTRACT

A filter device for filtering fluid, in particular an oil filter, is provided. The filter device includes a first filter medium and a second filter medium, the first filter medium having a greater filter action than the second filter medium, and the filter media being folded in pleated form and having a plurality of folds, the first filter medium and the second filter medium being connected to one another in the longitudinal direction of the folds. An easily producible and highly effective filter device is thus achieved.

13 Claims, 3 Drawing Sheets

FILTER DEVICE

CROSS-REFERENCE TO RELATED APPLICATIONS

This application claims priority to foreign Patent Application DE 10 2008 038602.2, filed on Aug. 21, 2008, the disclosure of which is incorporated herein by reference in its entirety.

FIELD OF THE INVENTION

The present invention relates to a filter device for filtering fluid. Specifically, the present invention relates to an oil filter.

BACKGROUND OF THE INVENTION

In engine transmissions, higher and higher requirements are placed in regard to performance capability, shift comfort, and environmental compatibility. This applies, for example, to a continuous transmission or double-clutch transmission. This is an automated shift transmission which allows a fully automatic gear change without traction force interruption using two partial transmissions. In a transmission of this type, a wet clutch may be used with engines having high torque. The waste heat arising during the shift procedure and starting is dissipated via a coolant oil stream. The transmission itself is typically used as an oil sump. The oil is thus used both for cooling the clutch and also for lubricating the wheelset. A high purity of the oil used is a requirement for smooth operation.

To increase the oil purity, suction oil filters and pressure oil filters are used. The currently available filters function well and reliably, however, the manufacturing effort for a pressure oil filter having multiple filter media, for example, is often quite high. Furthermore, it is desirable if the weight of a pressure oil filter of this type may be reduced further, without having to accept losses in the achievable oil purity at the same time. In regard to simple reuse, the pressure oil filter is to have a simple construction and is to be recyclable.

SUMMARY OF THE INVENTION

Embodiments of the present invention advantageously provide a filter device for filtering fluid, using which high oil purity is achievable, the filter device having a low weight, being simple to manufacture, occupying little space, and being recyclable.

The filter device for filtering fluid, in particular an oil filter, includes at least one first filter medium and one second filter medium, the first filter medium having a different filter characteristic, for example, a greater filter action, than the second filter medium, and the filter media being folded in pleated form and having a plurality of folds, the first filter medium and the second filter medium being connected to one another in the longitudinal direction of the folds.

Through the pleated embodiment and the two different filter media, high oil purity may be achieved in a small space. The connection of the filter media in the longitudinal direction requires only few or no additional components, so that the weight and the space required may be kept low. A connection of the filter media in the longitudinal direction of the folds is easily producible. The different properties of the filter media such as flow resistance and filtering capability may be combined well with one another in a single filter device in this way.

The filter device is implemented in such a way that fluid flowing in through an inflow opening is first incident on the first filter medium, which has a greater filter action than the second filter medium, so that a first part of the fluid permeates the first filter medium and a second, significantly greater part of the fluid flows around the first filter medium in order to permeate the second filter medium, so that a homogeneous permeation of the filter device is made possible. In this way, the pressure drop which is caused by the total flow resistance of the filter media is less than in a filter device in which exclusively a filter first medium having greater filter action is contained. Simultaneously, however, because of the permeation of the first filter medium, which is first achieved in a large proportion by the inflowing oil, good filtering of the oil occurs relatively rapidly.

The inflow opening is preferably situated in such a way that the shortest flow path of the fluid from the inflow opening to an outflow opening of the filter device runs through the first filter medium. This automatically has the result that the fluid is first incident on the denser first filter medium.

In a further advantageous embodiment, the longitudinal axis of an inflow section which joins the inflow opening encloses an acute angle $\alpha$ between 10° and 80°, preferably between 30° and 60°, with the longitudinal axis of the filter device. Favorable flow guiding is thus also achieved.

Furthermore, the filter media which are connected to one another may be connected to end caps on their front faces, a first end cap being fluid-tight and a second end cap having an opening for the outflow of filtered fluid. The fluid-tight end cap allows simple assembly with the filter media, the fluid stream being oriented easily in connection with the second end cap. Furthermore, only two end caps are necessary, although two different filter media are used. A construction in which each filter medium is placed separately between two end caps and several filter media are situated in series in a filter device, so that a cascading filtering is achieved, higher manufacturing outlay additionally existing and a relatively high weight being achieved, may be avoided by the inventive filter device.

The first filter medium and the second filter medium are preferably connected to one another in the longitudinal direction of the folds by clips, ultrasonic welding, or gluing. This may be implemented easily using manufacturing technology and is connected to almost no additional weight. A high level of filtering is achieved if the first filter medium is an ultrafine filter medium and the second filter medium is a fine filter medium. The inflowing oil stream thus flows first onto the ultrafine filter medium, which allows a high level of filtering, while the oil flowing around it is incident on the fine filter.

Simple manufacturing of the filter device is also provided if the filter media which are connected to one another form a filter star. The available space is thus used well with the maximum possible filter area.

BRIEF DESCRIPTION OF THE DRAWINGS

The invention is described in greater detail hereafter on the basis of an exemplary embodiment illustrated in the drawing. In the figures.

DETAILED DESCRIPTION

Figure 1:
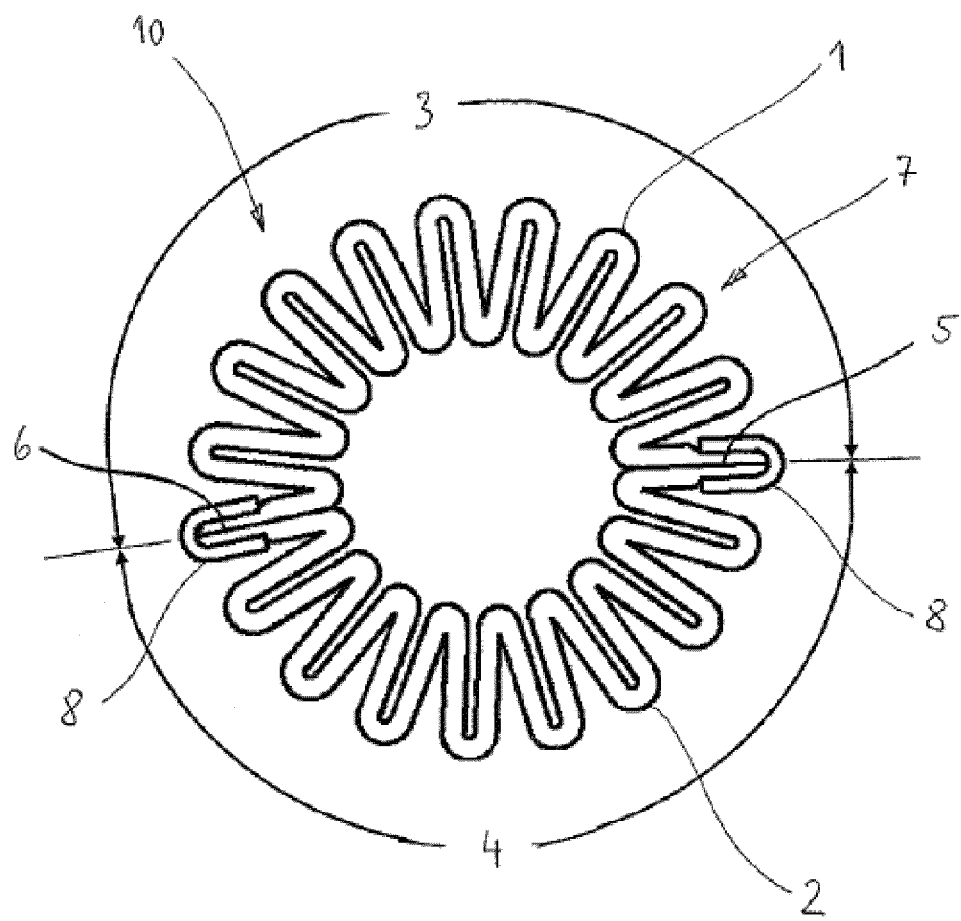
FIG. 1 shows a side view of a filter star for a filter device according to an embodiment of the present invention.

The invention will now be described with reference to the drawing figures, in which like reference numerals refer to like parts throughout.

Figure 2:
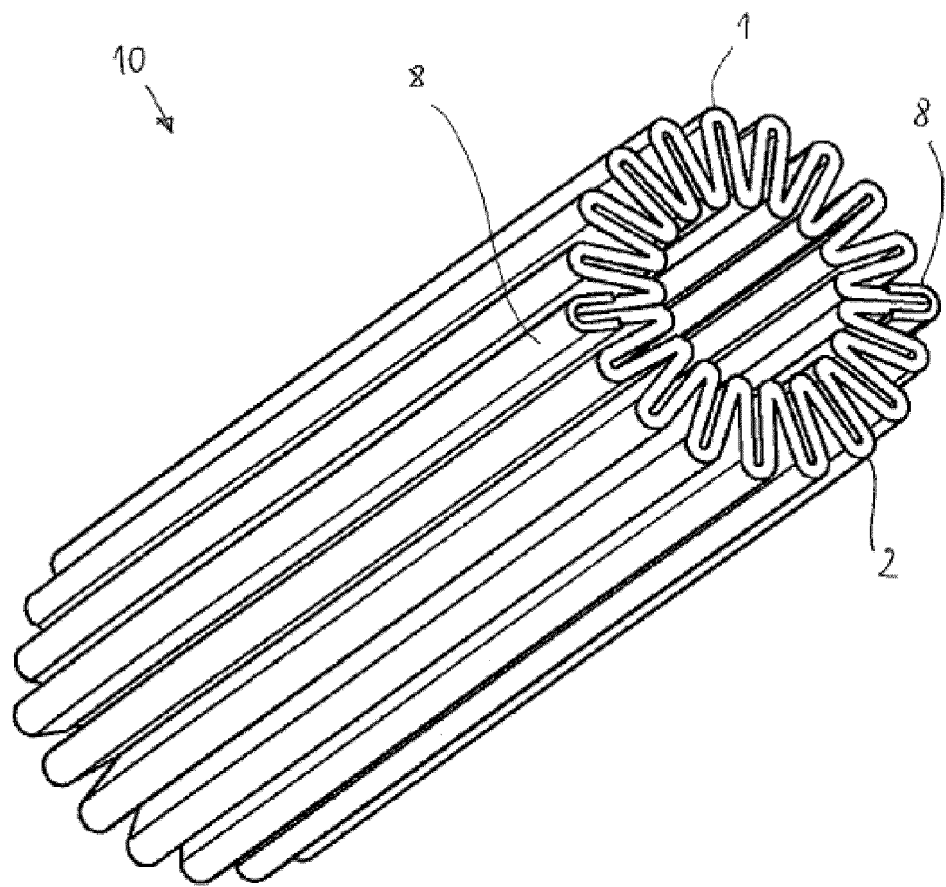
FIG. 2 shows a perspective illustration of the filter star from FIG. 1.

FIG. 1 shows a side view and FIG. 2 shows a perspective view of a filter star 10 for a filter device 100 according to an embodiment of the present invention. The filter star 10 has a first filter medium 1 and a second filter medium 2, the first filter medium 1 having a greater filter action than the second filter medium. The first filter medium 1 and the second filter medium 2 are each implemented in pleated form and have a plurality of folds 7. The pleated form of the filter medium 1 is situated in the filter star shown in FIG. 1 in the form of a semicircle 3, for example, the filter medium 2 also approximately implementing a semicircle 4 in a similar way. The filter media 1 and 2 contact one another at faces 5 and 6, which are implemented in the longitudinal direction of the folds 7. The filter media are connected to one another at these contact faces 5 and 6. The connection may be performed, for example, by clamping elements (clips) 8, by adhesive, or by ultrasonic welding. Filter media 1 and 2 connected in this way, which each implement a semicircle 3 and 4, result in a complete circle in this way. In the side view, the filter media 1 and 2 thus form a star-shaped configuration, which may thus be referred to as a filter star.

Figure 3:
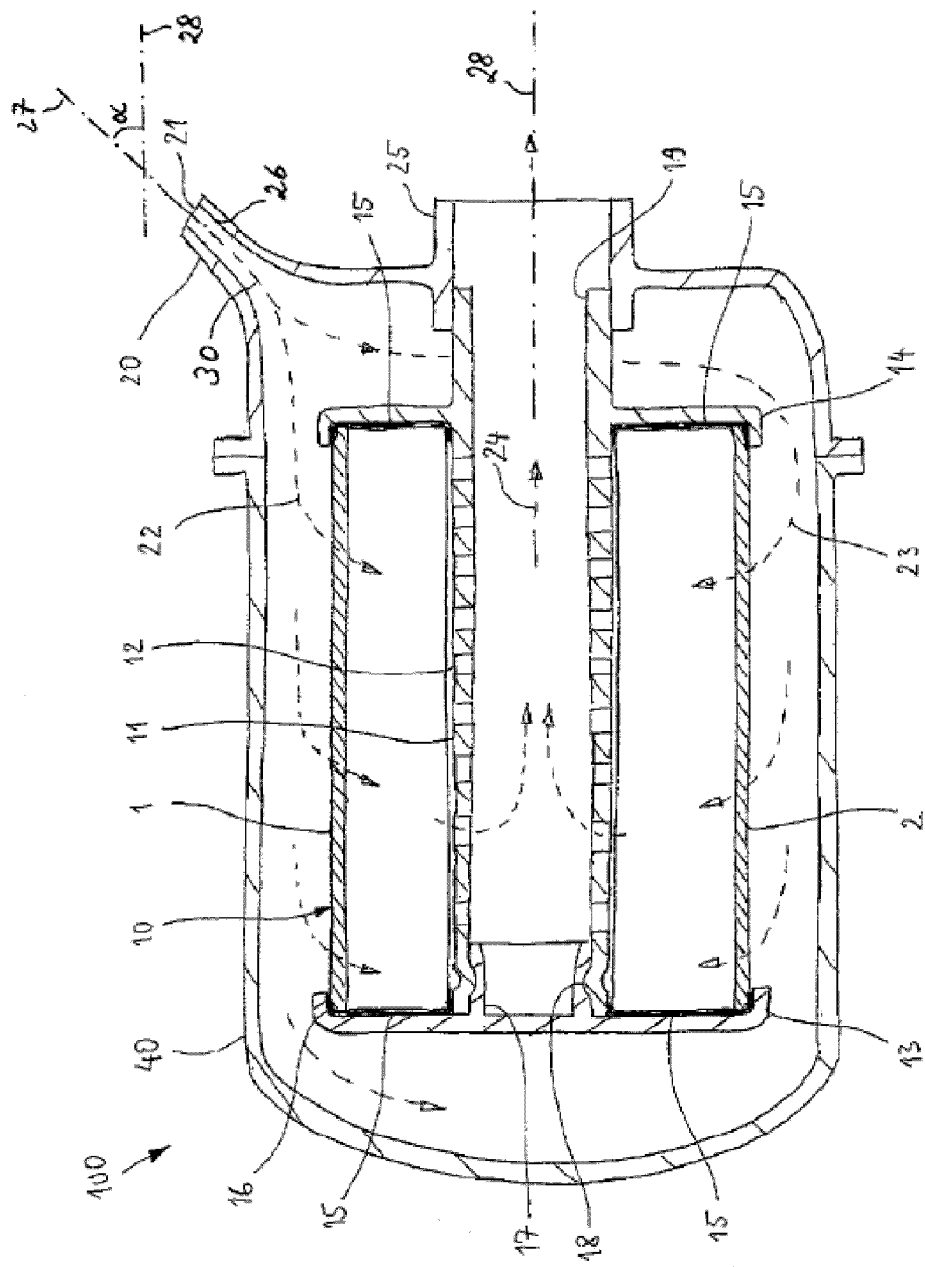
FIG. 3 shows a cross-sectional view of a filter device according to an embodiment of the present invention.

A cross-sectional view of an embodiment of a filter device 100 having a filter star 10 as previously described is shown in FIG. 3. The filter star 10 is situated around a hollow cylinder 11, which is provided with passage openings 12 for a fluid to be filtered. A first end cap 13 and a second end cap 14 are situated on the front sides of the filter star 10. The hollow cylinder 11 and end caps 13 and 14 cause, inter alia, the filter star 10 to be held inside the filter device in a predetermined location. The filter star 10 is preferably connected at glued joints 15 to the end caps 13 and 14. The glued joints 15 may be situated both on the front sides of the filter star 10 and also partially on the periphery of the filter star 10, e.g., reference numeral 16.

In the embodiment of the filter device shown in FIG. 3, the hollow cylinder 11 is implemented in one piece at one end with the second end cap 14. Through the one-piece or integral embodiment, work steps may be saved and production costs may be decreased. During the assembly, the filter star 10 may thus be pushed over the hollow cylinder 11, until it comes to rest on the second end cap 14. The first end cap 13 may subsequently be put onto the opposite end of the hollow cylinder 11, in the embodiment shown in FIG. 3, the first end cap 13 having a receptacle 17 in the central area, in which the hollow cylinder 11 may be engaged using a snap connection 18, for example.

The hollow cylinder 11, which is implemented in one piece with the second end cap 14, may be guided out of the end cap 14 on the opposite side and form a cylindrical fitting nozzle 19, which is connected to a filter cap 20. The filter cap 20 is connected to a filter housing 40, which encloses the filter star 10, the first end cap 13, and the second end cap 14.

The first end cap 13 may be provided with an overpressure valve, which is used for the purpose of dissipating an overpressure, which arises due to cold oil and the high viscosity connected thereto, for example, so that the filter body is not damaged.

The filter cap 20 has an inflow opening 21, through which fluid 30 may flow into the filter device 100. The fluid 30 first flows through a channel-type inflow section 26 to the first filter medium 1, e.g., dashed lines and arrow 22, and along a longer flow path to the second filter medium 2, e.g., arrow 23.

The longitudinal axis 27 of the inflow section 26 and the longitudinal axis 28 of the filter device 100 form an acute angle α, which is between 10° and 80°, preferably between 30° and 60°. The fluid 30 permeates the filter media 1 and 2 and reaches the hollow cylinder 11, the fluid passing the passage openings 12 and penetrating into the interior of the hollow cylinder 11. Because the first end cap 13 is fluid-tight, the fluid flows in the direction toward the second end cap 14, e.g., arrow 24, and from there to the fitting nozzle 19. It reaches the outflow opening 25 of the filter cap 20 there and may leave the filter device.

Because the first filter medium 1 has a greater filter action than the second filter medium 2, the fluid thus first penetrates through a relatively dense filter medium, whereby good filtering is achieved. Because a partial flow also reaches the less dense second filter medium 2, the total flow resistance is less than in a filter device which only contains a very dense filter medium.

Furthermore, the filter device has the advantage that in spite of only one first end cap 13 and one second end cap 14 having associated glued joints 15, two different filter media may be housed in the filter device. Through the connection of the filter media along the longitudinal direction of the folds, a filter star arises, which may be put onto the hollow cylinder just as simply as a filter star which is composed of only a single filter medium. In the filter device having the two different filter media, however, a greater level of filtering is achieved, than if only a second filter medium were provided. However, a lower pressure drop exists in the filter device than if only a first filter medium were contained in the filter device.

As a refinement of the example described above, more than two filter media having different filter characteristics may be assembled into a filter star.

The many features and advantages of the invention are apparent from the detailed specification, and, thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and, accordingly, all suitable modifications and equivalents may be resorted to that fall within the scope of the invention.

What is claimed is:

1. A filter device for filtering fluid, in particular an oil filter, comprising:
   a main housing forming a fluid chamber and having an open end defined in a first end wall of the housing;
   a housing cap disposed at the open end of the housing;
   a single inflow opening defined by part of the housing cap;
   a single inflow section, defined by part of the housing cap adjacent the inflow opening, that joins the inflow opening and has an inflow longitudinal axis that encloses an acute angle α between 10° and 80° with respect to the longitudinal axis of the filter device, wherein the inflow section has a diverging cross sectional shape leading towards an interior of the housing;
   an outflow opening; and
   filter media at least partially at a first side of the filter including at least one first filter medium and at least one second filter medium at least partially at a second side of the filter, the first filter medium having a greater filter action than the second filter medium, the filter media having a plurality of folds in pleated form, the first filter medium and the second filter medium connected to one another in the longitudinal direction of the folds, wherein the inflow section is at the first side of the filter, and the inflow axis is directed towards the first filter medium so that fluid flowing through the inflow opening is first incident on the first filter medium so that a first part of the fluid permeates the first filter medium and a second, significantly greater part of the fluid flows around the first filter medium and permeates the second filter medium, and wherein the fluid homogeneously permeates the filter device, wherein the filter media are connected to one another, on their front sides, to first and second filter end caps, the first filter end cap being fluid-tight and the second filter end cap having an opening for the outflow of filtered fluid, connected to the main housing open end, wherein the second end cap is internally spaced apart from the first end wall of the housing to permit fluid flow over the second filter end cap.

2. The filter device according to claim 1, wherein the shortest flow path of the fluid is from the inflow opening, through the first filter medium, to the outflow opening.

3. The filter device according to claim 1, wherein the acute angle α is between 30° and 60°.

4. The filter device according to claim 1, further comprising a hollow cylinder, including passage openings and a lateral surface upon which the filter media are disposed, integrally formed with the second end cap.

5. The filter device according to claim 1, wherein the first filter medium and the second filter medium are connected to one another by clips, ultrasonic welding, or gluing.

6. The filter device according to claim 1, wherein the first filter medium is an ultrafine filter medium and the second filter medium is a fine filter medium.

7. The filter device according to claim 1, wherein the filter media form a filter star.

8. The filter device according to claim 4, wherein the first end cap includes a centrally located receptacle that engages the hollow cylinder in a snap connection.

9. The filter device according to claim 5, further comprising an inflow section that joins the inflow opening and has a longitudinal axis that encloses an acute angle α between 10° and 80° with respect to the longitudinal axis of the filter device.

10. The filter device according to claim 9, wherein the acute angle α is between 30° and 60°.

11. The filter device according to claim 5, wherein the filter media are connected, on their front sides at glued joints, to first and second end caps, the first end cap being fluid-tight and the second end cap having an opening for the outflow of filtered fluid.

12. The filter device according to claim 5, further comprising a hollow cylinder, including passage openings and a lateral surface upon which the filter media are disposed, integrally formed with the second end cap.

13. The filter device according to claim 12, wherein the first end cap includes a centrally located receptacle that engages the hollow cylinder in a snap connection.

* * * * *